United States Patent [19]

Kanoh

[11] Patent Number: 5,299,146

[45] Date of Patent: Mar. 29, 1994

[54] MATRIX ARITHMETIC CIRCUIT

[75] Inventor: Toshiyuki Kanoh, Tokyo, Japan

[73] Assignee: NEC Corporation, Tokyo, Japan

[21] Appl. No.: 102,508

[22] Filed: Aug. 5, 1993

Related U.S. Application Data

[63] Continuation of Ser. No. 618,843, Nov. 28, 1990, abandoned.

[30] Foreign Application Priority Data

Nov. 28, 1989 [JP] Japan .................................. 1-306497

[51] Int. Cl.⁵ ............................. G06F 7/52; G06F 7/38
[52] U.S. Cl. ................................ 364/754; 364/750.5; 364/758
[58] Field of Search ............... 364/736, 745, 746, 754, 364/755, 758, 759, 760, 752, 718, 750.5

[56] References Cited

U.S. PATENT DOCUMENTS

| | | | |
|---|---|---|---|
| 4,718,031 | 1/1988 | Nukiyama ............................ | 364/754 |
| 4,719,588 | 1/1988 | Tatemichi et al. ................... | 364/754 |
| 4,819,155 | 4/1989 | Wulf et al. ........................... | 364/200 |
| 4,841,469 | 6/1989 | Kuenemund et al. ............... | 364/754 |
| 4,852,037 | 7/1989 | Aoki ..................................... | 364/736 |
| 5,021,987 | 7/1991 | Chan et al. .......................... | 364/754 |

OTHER PUBLICATIONS

Leung, S. S., et al., "Real-Time Direct Kinematics on a VLSI Chip," *Proceedings of a Real-Time System Symposium*, IEEE Computer Society Press, New York, U.S., Dec. 2, 1986, pp. 257-263.

"A Single-Chip 16-bit 25-ns Real-Time Video/Image Signal Processor", by Kouichi Kikuchi et al., IEEE Journal of Solid-State Circuits vol. 24, No. 6, Dec. 1989, pp. 1662-1667.

*Primary Examiner*—Long T. Nguyen
*Assistant Examiner*—Chuong D. Ngo
*Attorney, Agent, or Firm*—Sughrue, Mion, Zinn, Macpeak & Seas

[57] ABSTRACT

A matrix arithmetic circuit includes an address generator, a first multiplier, a second multiplier, and an accumulator. The address generator generates addresses of first, second, and third memories to read out matrix elements from the first, second, and third memories at predetermined timings. The first multiplier multiplies the first and second matrices. The second multiplier multiplies the multiplication result from the first multiplier and the third matrix. The accumulator accumulates the multiplication result from the second multiplier to obtain an arithmetic result.

2 Claims, 3 Drawing Sheets

MATRIX ARITHMETIC CIRCUIT

This is a continuation of U.S. patent application Ser. No. 07/618,843 filed Nov. 28, 1990, now abandoned.

BACKGROUND OF THE INVENTION

The present invention relates to an arithmetic circuit and, more particularly, to an arithmetic circuit for executing matrix multiplication.

FIG. 3 shows a conventional arithmetic circuit for consecutively executing matrix multiplication twice. Output ports DO of first and second memories 13 and 14 in which matrices X and Y are respectively stored are respectively connected to first and second input ports IA and IB of a first multiplier 9. An output port DO of a third memory 15 in which a matrix Z is stored is connected to a first input port IA of a second multiplier 11. Output ports A1, A2, A3, and A4 of an address generator 17 are respectively connected to address input ports A1 of the fourth, second, first, and third memories 16, 14, 13, and 15. An output port OZ of the first multiplier 9 is connected to an input port IX of a first accumulator 10. An output port OY of the first accumulator 10 is connected to an input port DI of the fourth memory 16. An output port Do of the fourth memory 16 is connected to a second input port IB of the second multiplier 11. An output port OZ of the second multiplier 11 is connected to an input port IX of a second accumulator 12. An output OY of the second accumulator 12 is connected to an output terminal 18.

Such an arithmetic circuit is designed to perform multiplication based on the matrices X, Y, and Z in the following manner. Elements of the matrices X and Y are respectively read out from the first and second memories 13 and 14, and a multiplication of $X \times Y$ is performed by using the first multiplier 9 and the first accumulator 10. The product of $X \times Y$ is then written in the fourth memory 16. In addition, an element of the matrix Z and elements of the product of $X \times Y$ are respectively read out from the third and fourth memories 15 and 16, and a multiplication of $(X \times Y) \times Z$ is performed by the second multiplier 11 and the second accumulator 12, thus executing matrix multiplication twice. This calculation method will be described in detail below.

Assume that the matrices X, Y, and Z are $N \times N$ matrices and are respectively constituted by elements given by following equations (1) to (3):

$$X = \begin{bmatrix} x_{00} & \cdots & \cdots & x_{0j} & \cdots & \cdots & x_{0(n-1)} \\ \cdot & & & \cdot & & & \cdot \\ \cdot & & & \cdot & & & \cdot \\ x_{i0} & \cdots & \cdots & x_{ij} & \cdots & \cdots & x_{i(n-1)} \\ \cdot & & & \cdot & & & \cdot \\ \cdot & & & \cdot & & & \cdot \\ x_{(n-1)0} & \cdots & & x_{(n-1)j} & \cdots & & x_{(n-1)(n-1)} \end{bmatrix} \quad (1)$$

$$Y = \begin{bmatrix} y_{00} & \cdots & \cdots & y_{0j} & \cdots & \cdots & y_{0(n-1)} \\ \cdot & & & \cdot & & & \cdot \\ \cdot & & & \cdot & & & \cdot \\ y_{i0} & \cdots & \cdots & y_{ij} & \cdots & \cdots & y_{i(n-1)} \\ \cdot & & & \cdot & & & \cdot \\ \cdot & & & \cdot & & & \cdot \\ y_{(n-1)0} & \cdots & & y_{(n-1)j} & \cdots & & y_{(n-1)(n-1)} \end{bmatrix} \quad (2)$$

$$Z = \begin{bmatrix} z_{00} & \cdots & \cdots & z_{0j} & \cdots & \cdots & z_{0(n-1)} \\ \cdot & & & \cdot & & & \cdot \\ \cdot & & & \cdot & & & \cdot \\ z_{i0} & \cdots & \cdots & z_{ij} & \cdots & \cdots & z_{i(n-1)} \\ \cdot & & & \cdot & & & \cdot \\ \cdot & & & \cdot & & & \cdot \\ z_{(n-1)0} & \cdots & & z_{(n-1)j} & \cdots & & z_{(n-1)(n-1)} \end{bmatrix} \quad (3)$$

In this case, each matrix element as a matrix multiplication result is represented by equation (4):

$$(X \times Y)_{lm} = \sum_{j=0}^{n-1} (x_{lj} \times Y_{jm}) \quad (4)$$

where $(n-1) \geq 1$ and m (integer) $\geq 0$.

If the product of $X \times Y$ is $X'$, the second multiplication is:

$$(X' \times Z)_{lm} = \sum_{j=0}^{n-1} (x'_{lj} \times Z_{jm}) \quad (5)$$

In the prior art, two consecutive matrix multiplications are performed by independently operating equations (4) and (5). The arithmetic circuit is designed to perform such calculations in the following manner. The calculation result of equation (4) obtained by the first multiplier 9 and the first accumulator 10 is temporarily stored in the fourth memory 16. Thereafter, the calculation result of equation (4) read out from the fourth memory 16 and the matrix Z read out from the third memory 15 are operated on the basis of equation (5).

In the above-described conventional arithmetic circuit, however, since two matrix multiplications are independently executed, a memory for storing an intermediate product of $(X \times Y)$ is required. In addition, since multipliers and accumulators are required in pairs, the number of elements and power consumption are increased. Therefore, in a semiconductor IC, the chip area is undesirably increased. Furthermore, unless calculation of a matrix element of the first matrix multiplication $(X \times Y)$ is completed, the second multiplication cannot be started, the operation time is undesirably prolonged.

SUMMARY OF THE INVENTION

It is an object of the present invention to provide a matrix arithmetic circuit having a small number of elements and consuming a small amount of power.

In order to achieve the above object, according to the present invention, there is provided a matrix arithmetic circuit, including first, second, and third memories for respectively storing first, second, and third matrices, for performing matrix multiplications based on the first, second, and third matrices, and further comprising an address generator for generating addresses of the first, second, and third memories to read out matrix elements from the first, second, and third memories at predetermined timings, a first multiplier for multiplying the first and second matrices, a second multiplier for multiplying the multiplication result from the first multiplier and the third matrix, and an accumulator for accumulating the multiplication result from the second multiplier to obtain an arithmetic result.

According to the present invention, the respective circuit components are connected as follows. The output of the first memory is connected to the first input of the first multiplier. The output of the second memory is connected to the second input of the first multiplier. The output of the third memory is connected to the first input of the second multiplier. The output of the first multiplier is connected to the second input of the second multiplier. The output of the second multiplier is connected to the input of the accumulator.

DESCRIPTION OF THE PREFERRED EMBODIMENT

Figure 1:
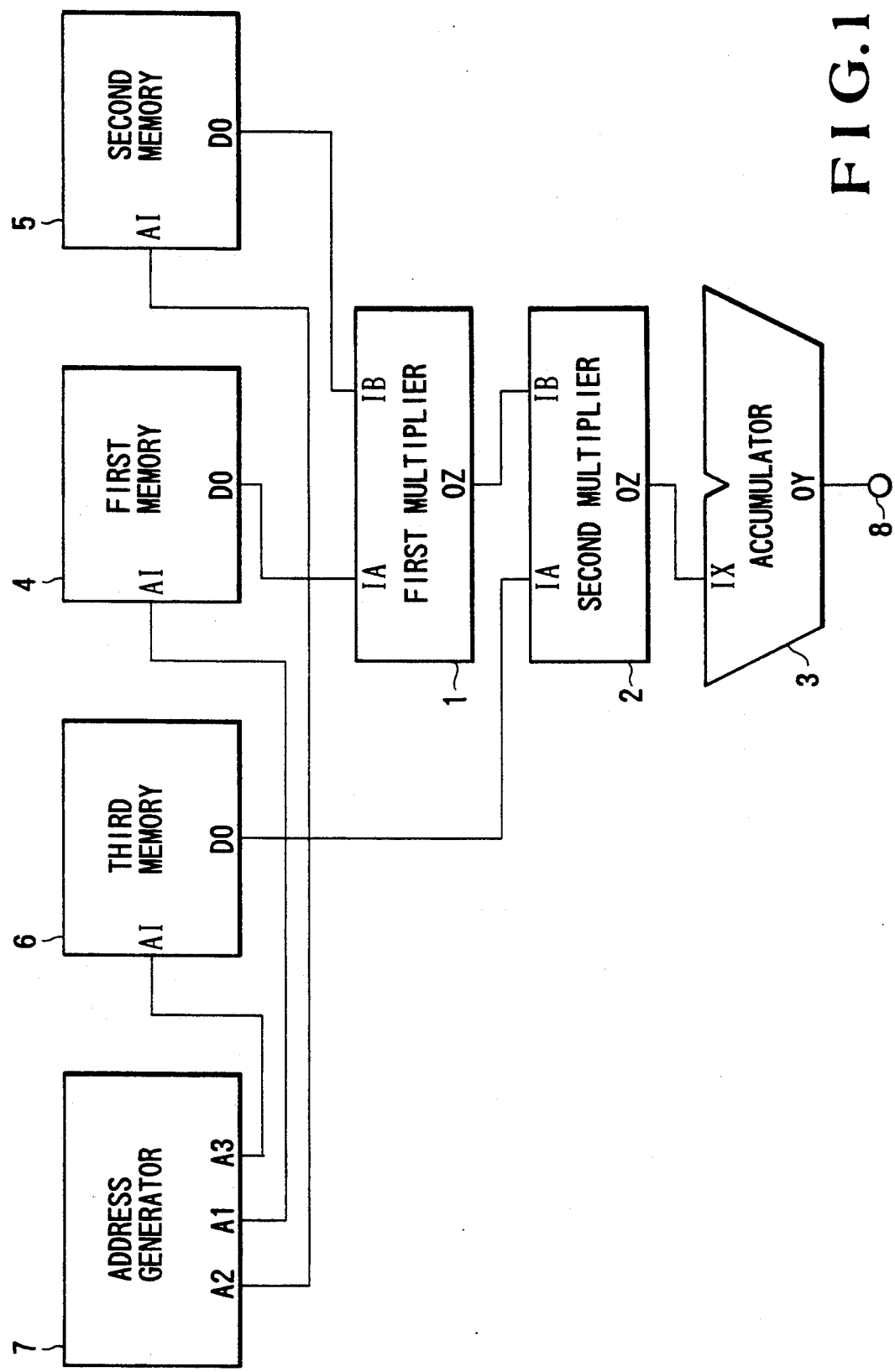
FIG. 1 is a circuit diagram showing a matrix arithmetic circuit according to an embodiment of the present invention.

FIG. 1 is a block diagram showing an arithmetic circuit of the present invention. An output OZ of a first multiplier 1 is connected to an input IB of a second multiplier 2. An output OZ of the second multiplier 2 is connected to an input IX of an accumulator 3. Inputs IA and IB of the first multiplier 1 and an input IA of the second multiplier 2 are respectively connected to outputs DO of first, second, and third memories 4, 5, and 6 in which matrices X, Y, and Z are respectively stored. In addition, outputs A1, A2, and A3 of an address generator 7 are respectively connected to addresses A1 of the first, second, an third memories 4, 5, and 6. An output OY of the accumulator 3 is connected to an output terminal 8. With this arrangement, an arithmetic circuit for executing matrix multiplication twice is realized. A matrix multiplication method of this arithmetic circuit will be described below.

A second multiplication result is obtained according to equations (1) to (4) described above and is represented by:

$$(X \times Y \times Z)_{lm} = \sum_{j=0}^{n-1} \left( \sum_{i=0}^{n-1} (x_{li} \times Y_{ij}) \times z_{jm} \right) \quad (6)$$

$$= \sum_{j=0}^{n-1} \left( \sum_{i=0}^{n-1} (x_{li} \times Y_{ij} \times z_{jm}) \right) \quad (7)$$

Figure 3:
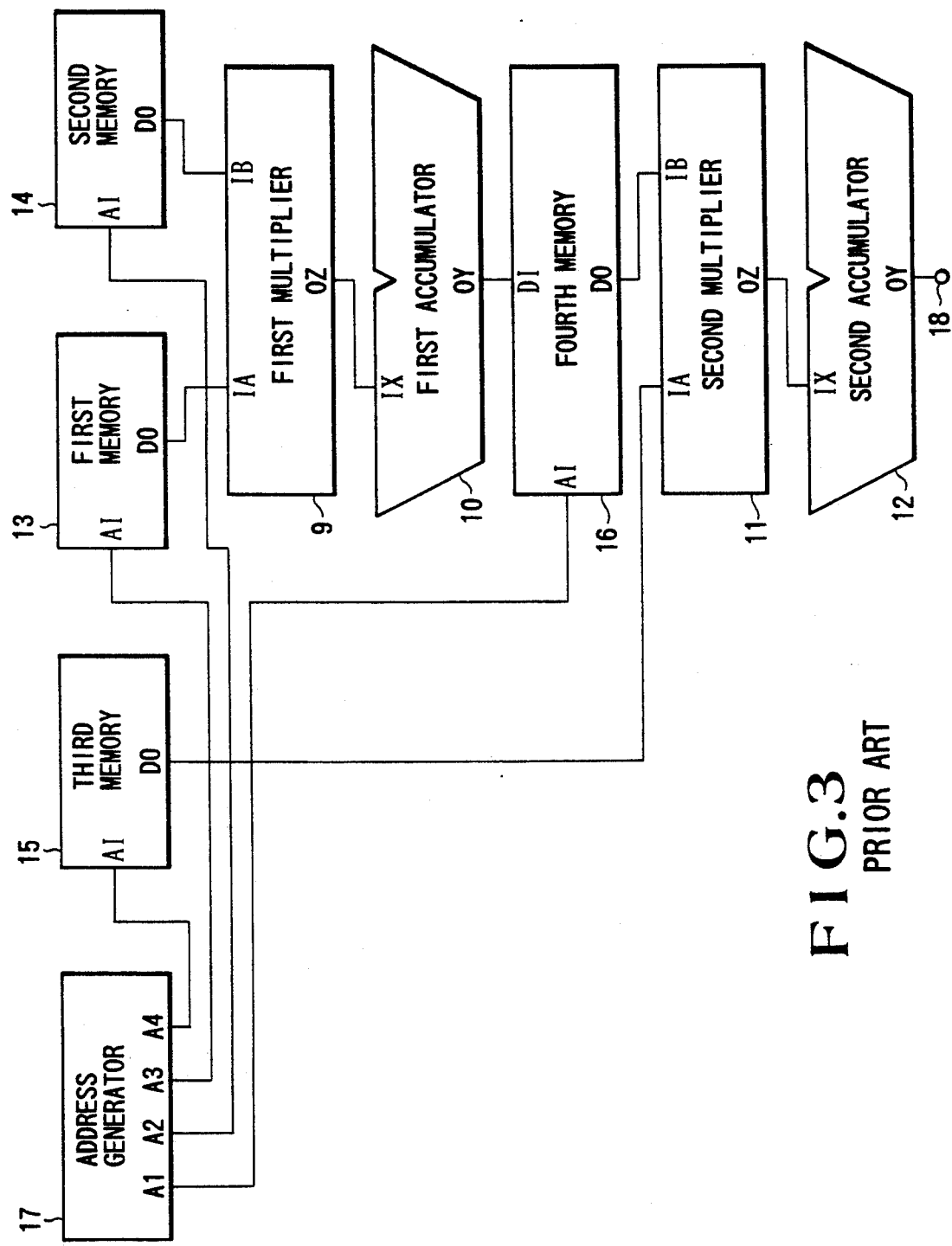
FIG. 3 is a circuit diagram showing a conventional matrix arithmetic circuit.

Equation (7) can be solved by executing two multiplications in series and accumulating the multiplication results. That is, in the arithmetic circuit shown in FIG. 1, the respective elements of the matrices X and Y read out from the first and second memories 4 and 5 are multiplied together by the first multiplier 1, and the multiplication results are respectively multiplied by elements of the matrix Z read out from the third memory 6 by using second multiplier 2 without accumulating the results. The multiplication results obtained by the second multiplier 2 are then accumulated by the accumulator 3. With this processing, an arithmetic result equivalent to the one obtained by the prior art shown i FIG. 3 can be obtained.

Figure 2:
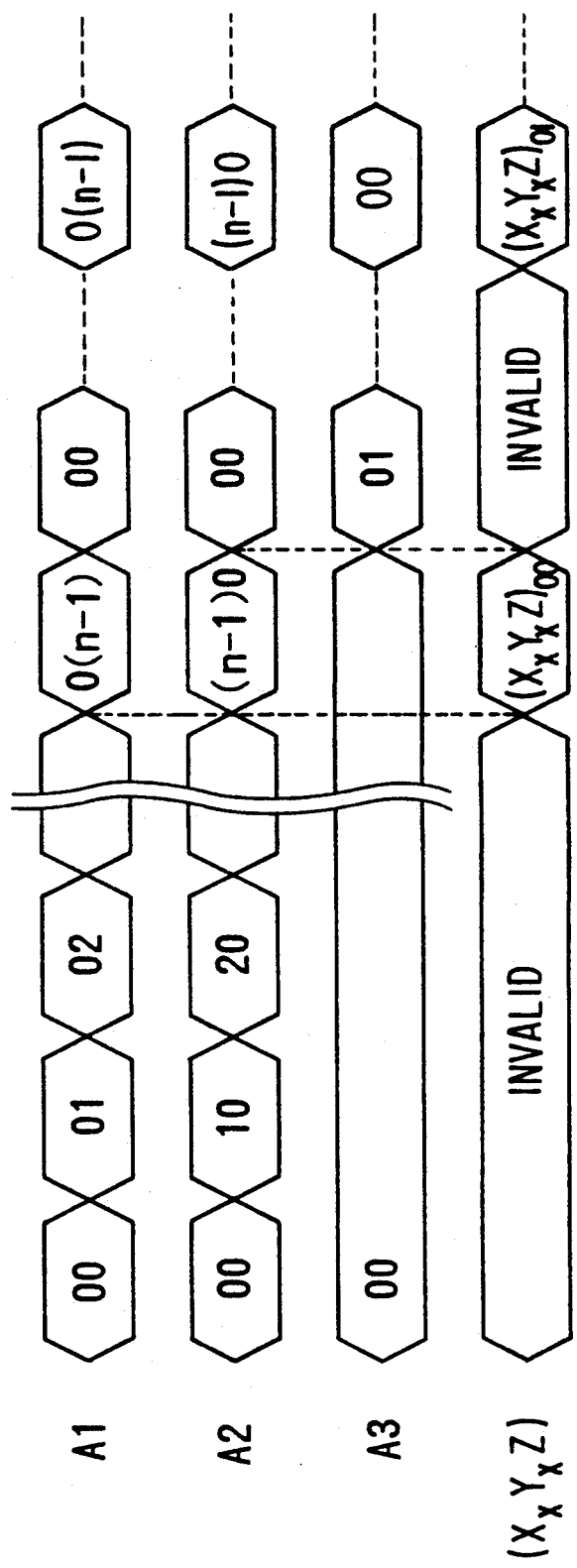
FIG. 2 is a timing chart showing output signals from a address generator.

FIG. 2 shows a timing chart of output addresses from the address generator 7 which are used to read out matrix elements from the first to third memories 4 to 6, respectively. The address output A1 corresponds to row elements of equation (1) described above. Similarly, the address A2 corresponds to column elements of equation (2); and the address output A3, matrix elements of equation (3).

As described above, according to the present invention, an arithmetic circuit is constituted by two multipliers and one accumulator, thereby providing a matrix arithmetic circuit having a small number of elements and consuming a small amount of power.

What is claimed is:

1. A matrix arithmetic circuit, including first, second, and third memories for respectively storing first, second, and third matrices, for performing a matrix multiplication based on the first, second, and third matrices, comprising:

an address generator for generating addresses of said first, second, and third memories to read out matrix elements from said first, second, and third memories at predetermined timings;

a first multiplier exclusive of accumulator means or memory means for multiplying elements of the first matrix with respective elements of the second matrix a second multiplier for multiplying elements of a resulting product output by said first multiplier with respective elements of said third matrix, wherein said elements of said resulting product are directly supplied from said first multiplier to said second multiplier; and a single accumulator for accumulating a multiplication result from said second multiplier to obtain a matrix multiplication result.

2. A circuit according to claim 1, wherein an output of said first memory is connected to a first input of said first multiplier, an output of said second memory is connected to a second input of said first multiplier, an output of said third memory is connected to a first input of said second multiplier, an output of said first multiplier is connected to a second input of said second multiplier, and an output of said second multiplier is connected to an input of said accumulator.

* * * * *